United States Patent
Ishida et al.

(10) Patent No.: US 10,534,505 B2
(45) Date of Patent: Jan. 14, 2020

(54) TECHNIQUE FOR PREVENTING UNNECESSARY OVERLAP OF USER INTERFACES

(71) Applicant: CANON KABUSHIKI KAISHA, Tokyo (JP)

(72) Inventors: Tomoya Ishida, Yokohama (JP); Rikiya Saito, Tokyo (JP); Ryoko Unishi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 230 days.

(21) Appl. No.: 15/221,231

(22) Filed: Jul. 27, 2016

(65) Prior Publication Data
US 2017/0038921 A1 Feb. 9, 2017

(30) Foreign Application Priority Data
Aug. 7, 2015 (JP) .................. 2015-157508

(51) Int. Cl.
*G06F 3/0482* (2013.01)
*G06F 3/0481* (2013.01)
*G06F 3/0484* (2013.01)
*H04N 1/00* (2006.01)

(52) U.S. Cl.
CPC .......... *G06F 3/0482* (2013.01); *G06F 3/0484* (2013.01); *G06F 3/04817* (2013.01); *H04N 1/00196* (2013.01)

(58) Field of Classification Search
CPC .............. H04N 1/00196; G06F 3/0482; G06F 3/04845; G06F 3/0484; G06F 3/04817
See application file for complete search history.

(56) References Cited

U.S. PATENT DOCUMENTS

| | | | | | |
|---|---|---|---|---|---|
| 5,621,904 | A | * | 4/1997 | Elliott | G06F 3/0481 715/798 |
| 6,025,841 | A | * | 2/2000 | Finkelstein | G06F 3/0481 715/803 |
| 6,760,048 | B1 | * | 7/2004 | Bates | G06F 3/0481 715/781 |

(Continued)

FOREIGN PATENT DOCUMENTS

| | | |
|---|---|---|
| JP | 02089123 A | 3/1990 |
| JP | 05150926 A | 6/1993 |

(Continued)

OTHER PUBLICATIONS

Japanese Office Action issued in corresponding Japanese Application No. 2015157508 dated Aug. 10, 2018.

*Primary Examiner* — Justin R. Blaufeld
(74) *Attorney, Agent, or Firm* — Venable LLP

(57) ABSTRACT

An acquisition unit acquires, for a target object displayed on a display screen, a plurality of candidates to lay out a user interface on the display screen so as not to overlap the target object. A specifying unit specifies an amount of protrusion, protruding from a first display area including the target object in the display screen, of a candidate acquired by the acquisition unit. A selection unit selects, based on the amount of protrusion specified by the specifying unit, one candidate out of the plurality of candidates. A display control unit displays, based on the candidate selected by the selection unit, the user interface on the display screen.

17 Claims, 13 Drawing Sheets

(56) References Cited

U.S. PATENT DOCUMENTS

| | | | |
|---|---|---|---|
| 8,375,332 B2* | 2/2013 | Park | G06F 16/435 715/838 |
| 2004/0064498 A1* | 4/2004 | Imanishi | A63F 13/12 709/201 |
| 2004/0261037 A1* | 12/2004 | Ording | G06F 3/0481 715/788 |
| 2005/0278636 A1* | 12/2005 | Nomoto | G06T 5/00 715/724 |
| 2007/0174790 A1* | 7/2007 | Jing | G06F 3/0482 715/838 |
| 2007/0174791 A1* | 7/2007 | Park | G06F 16/435 715/838 |
| 2007/0279485 A1* | 12/2007 | Ohba | G06F 3/012 348/41 |
| 2009/0100455 A1* | 4/2009 | Frikker | G06Q 30/02 725/13 |
| 2010/0088623 A1* | 4/2010 | Ichino | G06F 3/0481 715/766 |
| 2012/0072867 A1* | 3/2012 | Schlegel | G06F 3/0481 715/808 |
| 2012/0311473 A1* | 12/2012 | Nolterieke | G06F 9/451 715/768 |
| 2014/0118781 A1* | 5/2014 | Kobayashi | G06F 3/048 358/1.15 |
| 2015/0293652 A1* | 10/2015 | Saito | G06F 3/0482 715/211 |
| 2016/0291747 A1* | 10/2016 | Fischer | G06F 3/0488 |
| 2017/0038921 A1* | 2/2017 | Ishida | G06F 3/0484 |
| 2017/0169002 A1* | 6/2017 | Motoi | G06F 3/04883 |

FOREIGN PATENT DOCUMENTS

| | | |
|---|---|---|
| JP | 2005216061 A | 8/2005 |
| JP | 201111804 A | 6/2011 |
| JP | 2011114804 A | 6/2011 |
| JP | 4756876 B2 | 8/2011 |

* cited by examiner

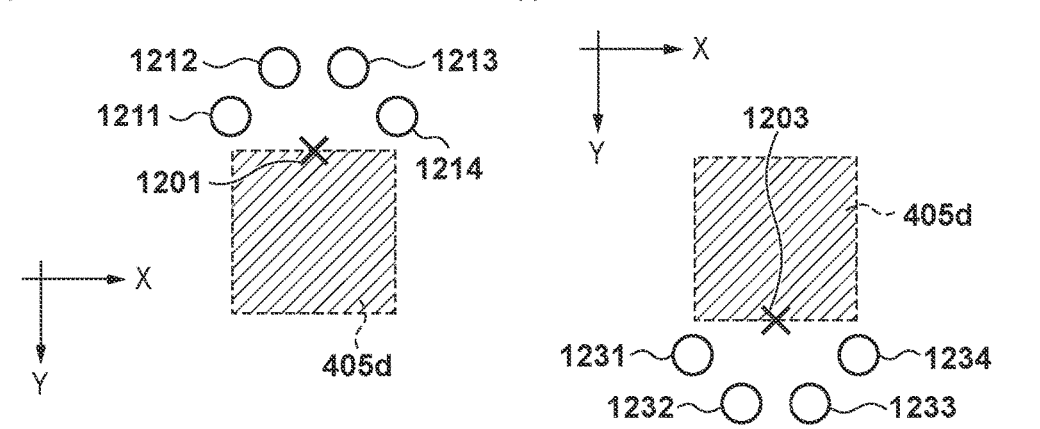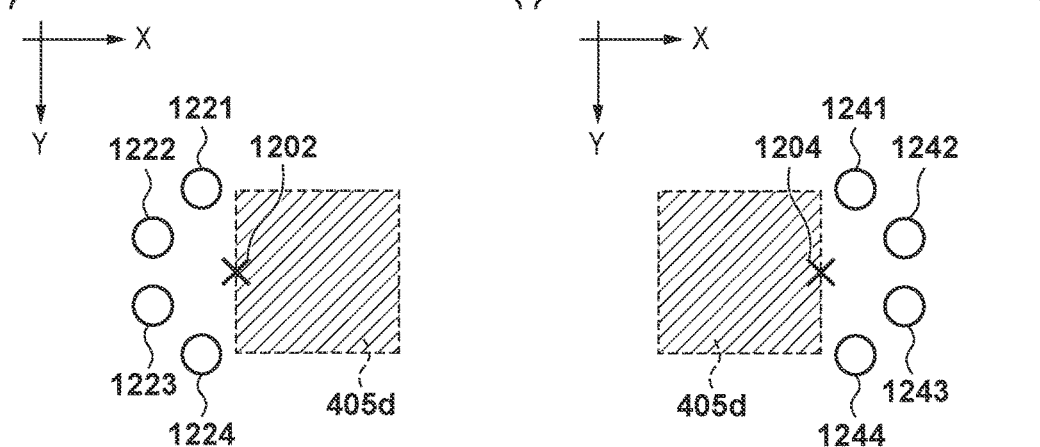

TECHNIQUE FOR PREVENTING UNNECESSARY OVERLAP OF USER INTERFACES

BACKGROUND OF THE INVENTION

Field of the Invention

The present invention relates to a user interface display control technique.

Description of the Related Art

In a conventional image processing apparatus, an image related to image data is displayed on the display screen of an LCD (Liquid Crystal Display) forming a user interface, and processing such as editing and correction is performed by designating the image displayed on the display screen. In a case in which there are a plurality of processes such as editing or correction for an image, a plurality of processing selection candidates are displayed on the screen when an image is designated, and the desired processing is selected by a user. In Japanese Patent No. 4756876, an area to perform processing such as image correction is designated in an image by a user, and a plurality of image processes which are selectable by the user are displayed near the designated area.

In Japanese Patent No. 4756876, a user is caused to make a selection by displaying a plurality of choices such as image processing near the area designated in an image by the user. However, when a plurality of choices are displayed near the designated area, the user interface which displays the choices overlaps the target image. Hence, the visibility of the entire image as a processing target is problematically reduced.

SUMMARY OF THE INVENTION

The present invention has been made in consideration of the above problem and provides a technique for displaying a user interface on a screen in consideration of the visibility of a processing target displayed on the screen.

According to the first aspect of the present invention, there is provided an image processing apparatus comprising: an acquisition unit configured to acquire, for a target object displayed on a display screen, a plurality of candidates to lay out a user interface on the display screen so as not to overlap the target object; a specifying unit configured to specify an amount of protrusion, protruding from a first display area including the target object in the display screen, of a candidate acquired by the acquisition unit; a selection unit configured to select, based on the amount of protrusion specified by the specifying unit, one candidate out of the plurality of candidates; and a display control unit configured to display, based on the candidate selected by the selection unit, the user interface on the display screen.

According to the second aspect of the present invention, there is provided an image processing method comprising: acquiring, for a target object displayed on a display screen, a plurality of candidates to lay out a user interface on the display screen so as not to overlap the target object; specifying an amount of protrusion, protruding from a first display area including the target object in the display screen, of the acquired candidate; selecting, based on the specified amount of protrusion, one candidate out of the plurality of candidates; and displaying, based on the selected candidate, the user interface on the display screen.

According to the third aspect of the present invention, there is provided a non-transitory computer readable storage medium storing a computer program for causing a computer to function as an acquisition unit configured to acquire, for a target object displayed on a display screen, a plurality of candidates to lay out a user interface on the display screen so as not to overlap the target object; a specifying unit configured to specify an amount of protrusion, protruding from a first display area including the target object in the display screen, of a candidate acquired by the acquisition unit; a selection unit configured to select, based on the amount of protrusion specified by the specifying unit, one candidate out of the plurality of candidates; and a display control unit configured to display, based on the candidate selected by the selection unit, the user interface on the display screen.

Further features of the present invention will become apparent from the following description of exemplary embodiments (with reference to the attached drawings).

BRIEF DESCRIPTION OF THE DRAWINGS

FIGS. 12A to 12H are views each showing an example of a process in step S201.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

An example of an image processing apparatus according to the first embodiment will be described. For a target object displayed on a display screen, a plurality of candidates are acquired to lay out a user interface on the display screen so as not to overlap the target object displayed on the display screen. Then, according to predetermined selection criteria, one candidate is selected out of the plurality of candidates, and the user interface is laid out based on the selected candidate and displayed on the display screen (display control).

Figure 1:
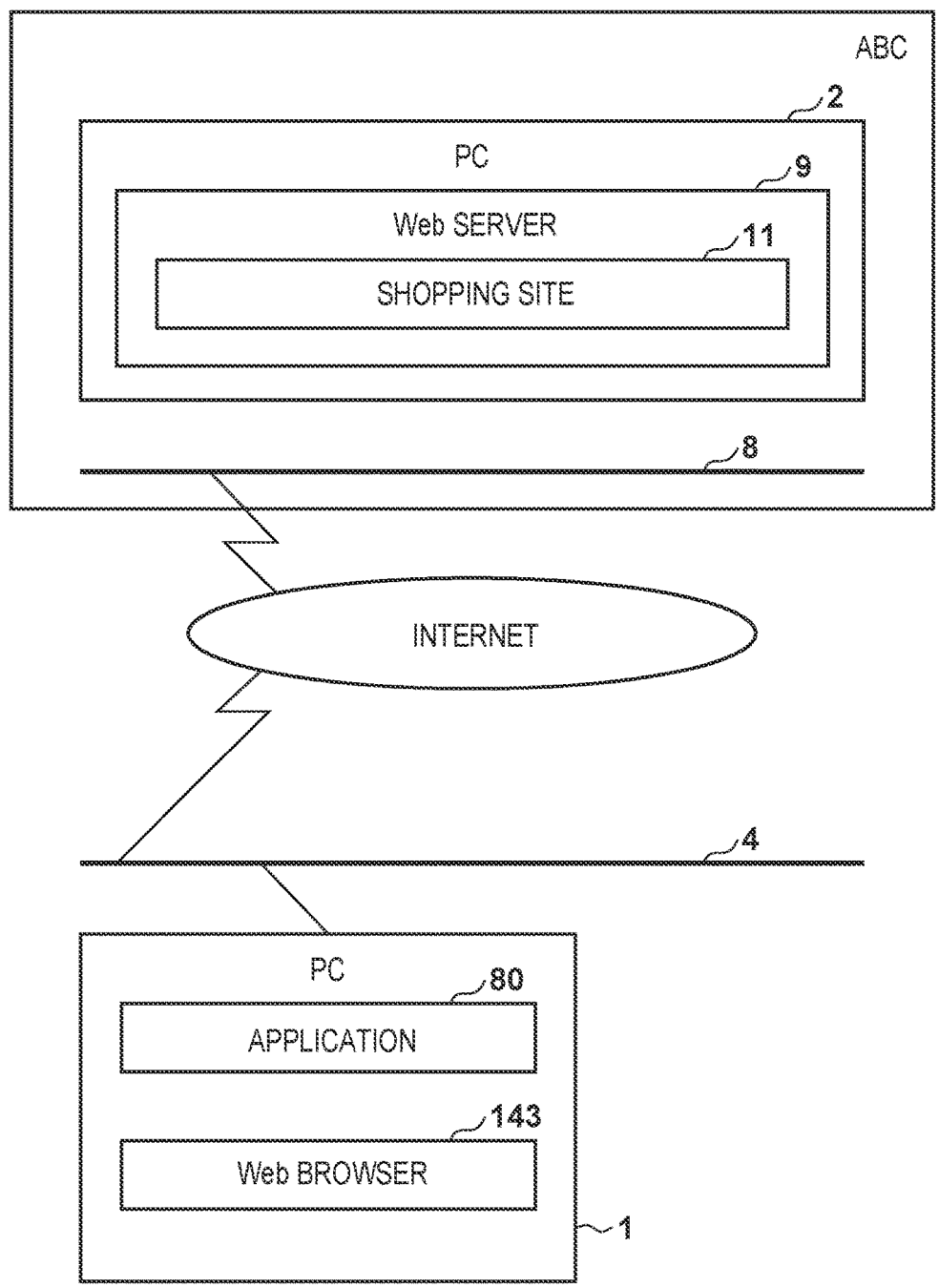
FIG. 1 is a block diagram showing an example of the arrangement of a system.

First, an example of the arrangement of a system according to the first embodiment will be described with reference to the block diagram of FIG. 1. As shown in FIG. 1, the system according to the first embodiment includes a PC (Personal Computer) 1 operated by a user to create a photo album and a PC 2 that is the server of ABC company which provides a photo album ordering Web site. The PC 1 and the PC 2 are connected so that data communication is possible with each other via the Internet.

First, the PC 1 will be described. An application 80 and a Web browser 143 are installed in the PC 1.

The application 80 is an application that provides various functions to create an album and upload the created album on the PC 2.

The Web browser 143 is a browser used when using WWW (WorldWideWeb). The Web browser 143 is an application that provides various functions that access the PC 2 to upload a photo album created on the PC 1 side onto the PC 2 or order a photo album via the ordering site provided by the PC 2.

The PC 1 is connected to a local area network 4 (for example, a home network for a general household constructed in the house of a user) such as Ethernet®. This local area network 4 is connected to the above-described Internet.

Next, the PC 2 will be explained. A Web server 9, which is a server function application, is installed in the PC 2. Furthermore, an application of a shopping site 11 serving as the photo album ordering site is included in the Web server 9.

The PC 2 is connected to a local area network 8 (for example, an office network constructed in the office of ABC company) such as the Ethernet®. The local area network 8 is connected to the above-described Internet.

Note that an OS (Operating System) is installed in each of the PCs 1 and 2. In either PC 1 or PC 2, the applications operate on this OS.

Figure 2:
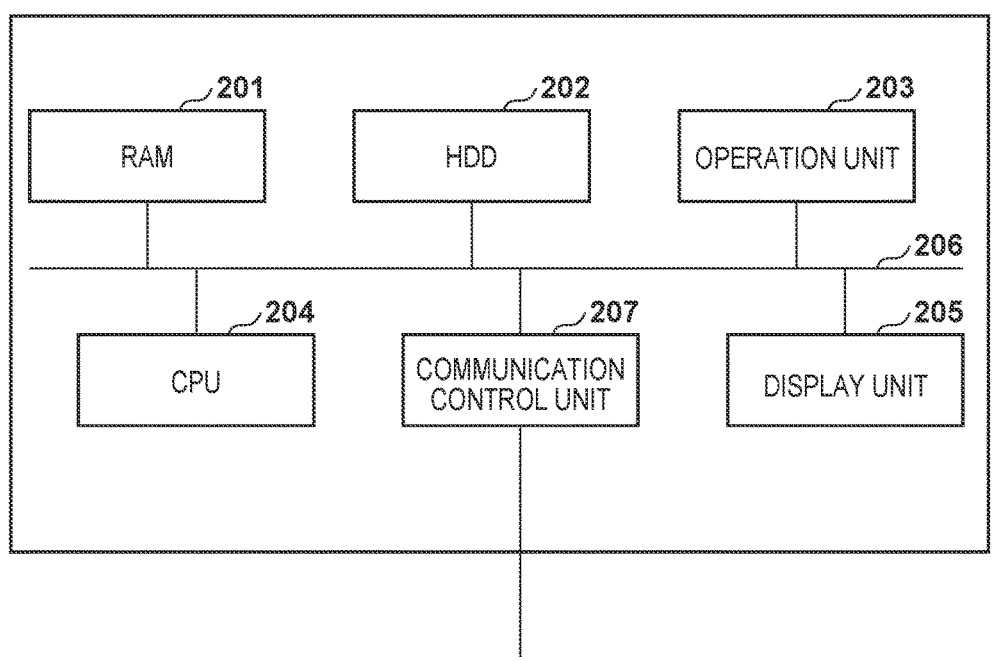
FIG. 2 is a block diagram showing an example of the hardware arrangement of a PC 1.

An example of the hardware arrangement of the PC 1 will be described next with reference to the block diagram of FIG. 2. Note that the hardware arrangement of the PC 2 can be the same as the hardware arrangement shown in FIG. 2 or a hardware arrangement different from that shown in FIG. 2 may be employed.

A RAM 201 includes an area to store a computer program and data loaded from an HDD (Hard Disk Drive) 202 and a computer program and data transmitted from the outside (for example, the PC 2) via a communication control unit 207. The RAM 201 further includes a work area used when a CPU 204 executes various kinds of processes. In this manner, the RAM 201 can appropriately provide various kinds of areas.

The HDD 202 is an example of a large-capacity information storage device. An OS, a computer program, and data that cause the CPU 204 to execute respective processes (to be described later) as processes to be performed by the PC 1 are saved in the HDD 202. The computer program includes the above-described application 80 and the Web browser 143. In addition, information that will be described as known data in processes to be described later is included in this data. The computer program and data saved in the HDD 202 are appropriately loaded in the RAM 201 under the control of the CPU 204 and become processing targets of the CPU 204.

An operation unit 203 is formed by an interface such as a keyboard or a mouse. The user can operate the operation unit 203 to input various types of operations to the CPU 204.

The CPU 204 controls the overall operation of the PC 1 by executing processing by using the computer program and data stored in the RAM 201 and executes or controls each process (to be described later) as a process performed by the PC 1.

The communication control unit 207 performs data communication with the PC 2 via the local area network 4 and the Internet.

A display unit 205 is formed from CRT, a liquid crystal screen, or the like and can display the processing result by the CPU 204 by using images and characters. Note that the display unit 205 and the operation unit 203 may be integrated to form a touch panel screen.

The RAM 201, the HDD 202, the operation unit 203, the CPU 204, the communication control unit 207, and the display unit 205 are connected to a bus 206.

Figure 3:
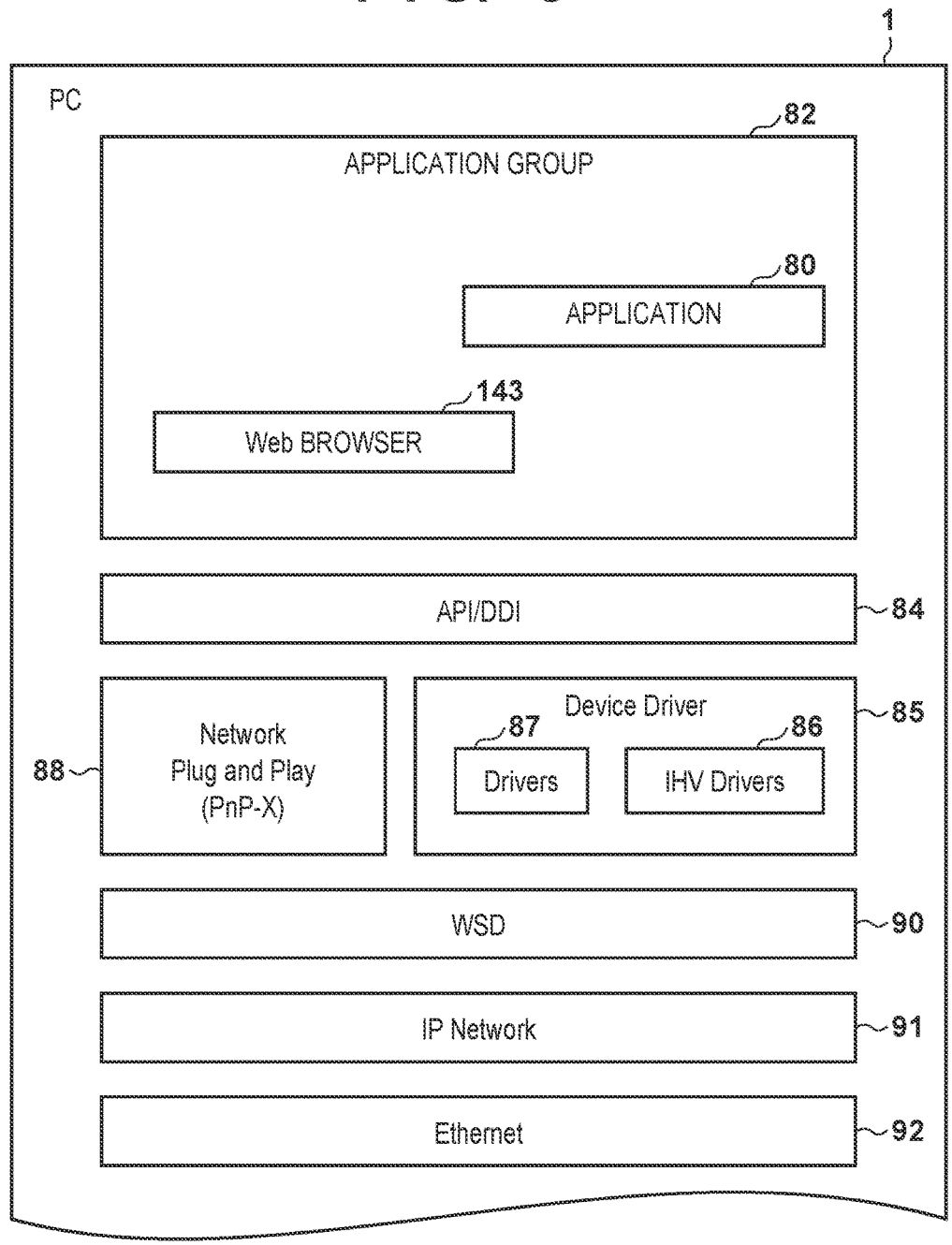
FIG. 3 is a view showing an example of the arrangement of a software module group saved in an HDD 202.

An example of the arrangement of a software module group saved in the HDD 202 of PC 1 will be described next with reference to FIG. 3. Note that the software module shown in FIG. 3 show not all but only some of the software modules saved in the HDD 202. In addition, the software module group saved in the HDD 202 is changed in accordance with the OS installed in the PC 1 or the use environment of the PC 1.

A module 92 is an Ethernet® control stack for controlling Ethernet®. A module 91 is an IP network control stack for controlling an IP network. A module 90 is a WSD control stack for controlling a WSD (Web Service on Devices) that provides a mechanism to search for a device on a network. A module 88 is a PnP-X control stack for controlling plug and play of a network. Note that PnP-X stands for Plug and Play Extensions that is installed in the Windows® 8 OS as a series of standard extension functions, and provides a support for a network connected device. A module 85 is a device driver group and includes standard drivers 87 bundled in the OS and IHV drivers 86 provided by Independent Hardware Vendor (IHV).

A module 84 is an application/DDI interface and includes Application Programming Interface (API) and Device Driver Interface (DDI). A module 82 is an application group and includes the application 80 and the web browser 143.

Figure 4:
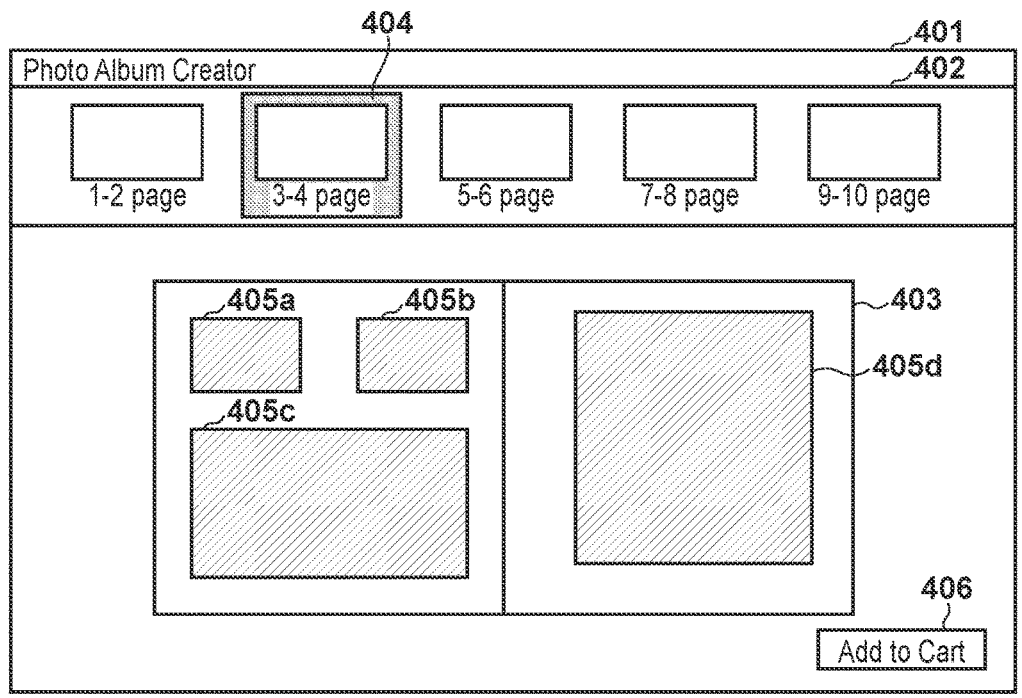
FIG. 4 is a view showing an example of the display of a window 401.

Processing to create a desired photo album by activating the application 80 in the PC 1 and laying out desired images on a predetermined area of each page of a photo album will be described next. When the application 80 is activated, a window 401 exemplified in FIG. 4 is displayed on the display screen of the display unit 205. Assume that the main unit for any subsequent processing such as the display control of the window 401, processing corresponding to the operation input made via the window 401 when the user operates the operation unit 203, or the like is the CPU 204 hereinafter.

Thumbnail images of the respective double spread pages of the album are displayed in a display area 402. In the display area 402, starting from the left, a thumbnail image of a double spread page including the first and second pages, a thumbnail image of a double spread page including the third and fourth pages, . . . , a thumbnail image of a double spread page including the 9th and 10th pages are displayed. In FIG. 4, the user has operated the operation unit 203 to designate the thumbnail image of the double spread page including the third and fourth pages. In this case, the thumbnail image is in a selected state (the thumbnail image is overlaid with a frame 404 and displayed), and "an image of the double spread page including the third and fourth pages" corresponding to the selected thumbnail image is displayed on the display area 403. Areas (photo slots) 405*a* to 405*d* where desired images can be laid out are provided in "the image of the double spread page including the third and fourth pages". The user can lay out desired images on the respective areas 405*a* to 405*d* by operating the operation unit 203. For example, if the user operates the operation unit 203 and designates one of the areas 405*a* to 405*d*, the CPU 204 acquires image groups (image data groups) from the HDD 202 or an external device and displays a list of the acquired images in the display unit 205. Then, when the user operates the operation unit 203 and selects one of the image groups (image data groups) displayed on the list, the CPU 204 automatically selects, from the selected image data group, the same number of images (image data) as the areas where the images can be laid out. The CPU 204 resizes and lays out the selected images on the respective areas designated by the user out of the areas 405*a* to 405*d*.

In this manner, a desired thumbnail image is designated out of the thumbnail images displayed in the display area 402, and a photo album is created by laying out the desired images in the image layout areas such as areas 405*a* to 405*d* in the image of the double spread page corresponding to the designated thumbnail image.

When the user operates the operation unit 203 and designates a button 406, the CPU 204 controls the communication control unit 207 and uploads the data of the created photo album to the PC 2.

In the first embodiment, after laying out the images on the respective areas 405*a* to 405*d* (or on at least one of the areas), various processes can be performed on the laid out images. For example, if the user operates the operation unit 203 and designates the area 405*d*, as shown as in FIG. 5, names of various processes applicable to the area 405*d* are displayed as icons (interfaces) 501 to 504 so as not to overlap the area 405*d*. The icons 501 to 504 are interfaces to designate processing to an object (in the first embodiment, an image laid out in each area). If the user operates the operation unit 203 and designates one of the icons 501 to 504, processing corresponding to the designated icon is performed on the image in the area 405*d* (or also on another image in addition to the image in the area 405*d*). For example, when the user operates the operation unit 203 and designates the icon 501, image processing called "Image Correction A" is performed on the image in the area 405*d*. If the user operates the operation unit 203 and designates the icon 502, image processing called "Image Correction B" is performed on the image in the area 405*d*. If the user operates the operation unit 203 and designates the icon 503, image processing called "Image Correction C" is performed on the image in the area 405*d*. If the user operates the operation unit 203 and designates the icon 504, image processing called "Image Correction D" is performed on the image in the area 405*d*.

Figure 5:
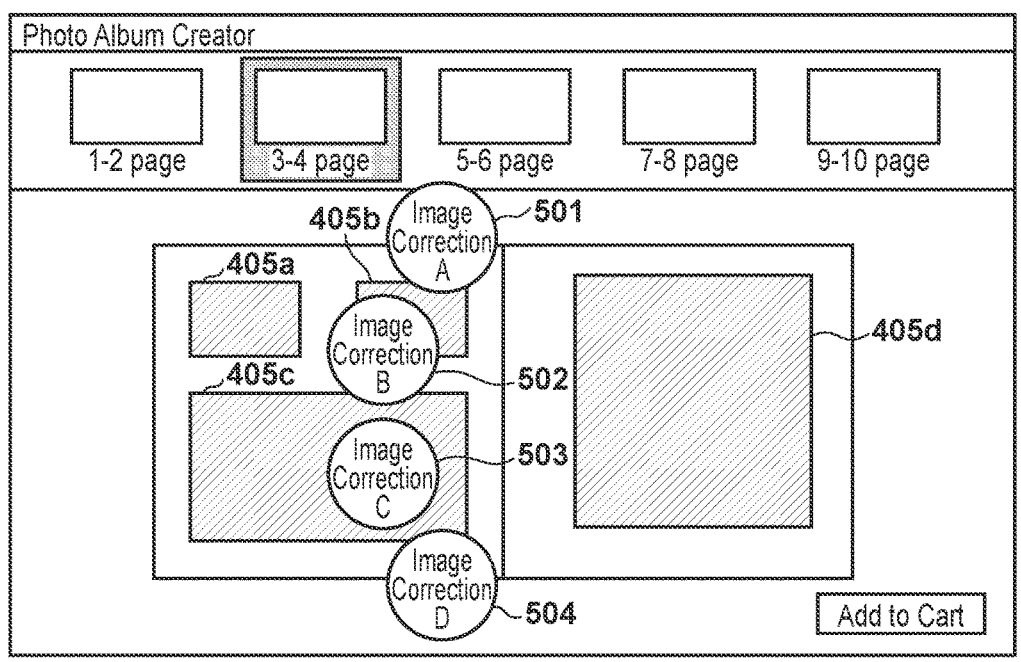
FIG. 5 is a view showing another example of the display of the window 401.

Note that although the number of processes for an image is four in FIG. 5, the number is not limited to this. In addition, as types of image processing, processing such as image luminance or tone correction, switching of images between designated areas, image trimming, and the like are used. However, the present invention is not limited to these types of image processing.

Processing performed by the PC 1 will be described next with reference to the flowchart of the processing shown in FIG. 6. In order to provide a detailed description, an example of a case in which "the thumbnail image of a double spread page including the third and fourth pages" in the display area 402 (display area) of the window 401 and the area 405*d* out of the areas 405*a* to 405*d* is designated will be given. However, even in a case in which another thumbnail image has been designated or in which an area other than the area 405*d* has been designated, the processing to be performed will be the same.

<Step S101>

When the user inputs a designation to activate the application 80 by operating the operation unit 203, the CPU 204 displays the window 401, shown in FIG. 4, on the display screen of the display unit 205.

<Step S102>

Assume that the user has operated the operation unit 203 and designated "the thumbnail image of the double spread page including the third and fourth pages" in the display area 402. Upon detecting the designation of the thumbnail image, the CPU 204 changes the thumbnail image to a selected state and causes "the image of the double spread page including the third and fourth pages" corresponding to the thumbnail image to be displayed on the display area 403. Here, assume that the user operates the operation unit 203 and designates the area 405*d* (object) out of the areas 405*a* to 405*d*. Upon detecting the designation of the object, the CPU 204 determines the layout positions of the respective icons 501 to 504. More particularly, the layout positions of the respective icons 501 to 504 are determined so as to be near the object but not overlap the area 405*d*.

<Step S103>

The CPU 204 lays out and displays the icons 501 to 504 in the positions determined in step S102. Details of the processes of steps S102 and S103 will be described next in accordance with the flowchart of FIG. 7.

<Step S201>

First, the CPU 204 obtains (specifies) areas where the icons 501 to 504 can be laid out in a plurality of locations around the area 405*d*. An example of a method for obtaining area candidates in a plurality of locations will be described with reference to FIGS. 12A to 12H.

As shown in FIG. 12A, four designation areas 1211, 1212, 1213, and 1214 outside the area 405*d* and spaced apart by a distance d from a center point 1201 on the upper side of the area 405*d* are obtained, and an area including these four designation areas is obtained as the upper candidate area.

As shown in FIG. 12C, four designation areas 1231, 1232, 1233, and 1234 outside the area 405*d* and spaced apart by the distance d from a center point 1203 on the lower side of the area 405*d* are obtained, and an area including these four designation areas is obtained as the lower candidate area.

As shown in FIG. 12B, four designation areas 1221, 1222, 1223, and 1224 outside the area 405*d* and spaced apart by the distance d from a center point 1202 on the left side of the area 405*d* are obtained, and an area including these four designation areas is obtained as the left candidate area.

As shown in FIG. 12D, four designation areas 1241, 1242, 1243, and 1244 outside the area 405*d* and spaced apart by the distance d from a center point 1204 on the right side of the area 405*d* are obtained, and an area including these four designation areas is obtained as the right candidate area.

Figure 12E:
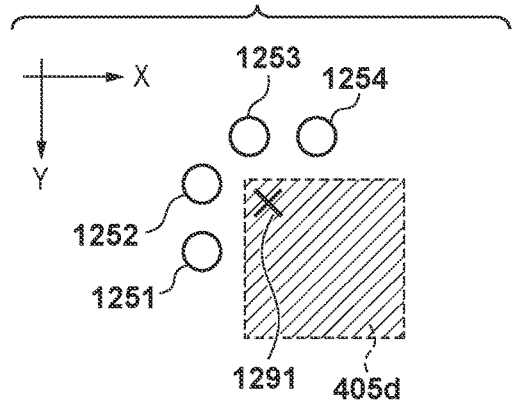

As shown in FIG. 12E, four designation areas 1251, 1252, 1253, and 1254 outside the area 405*d* and spaced apart by the distance d from the position of a point 1291 near (within the area 405*d*) the upper left apex of the area 405*d* are obtained, and an area including these four designation areas is obtained as the upper left candidate area.

Figure 12G:
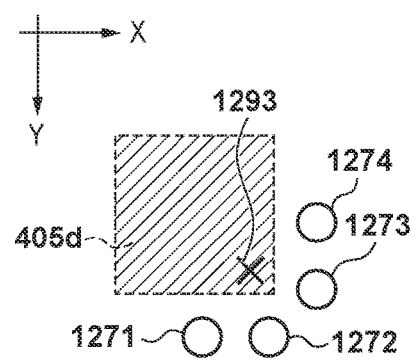
Figure 12F:
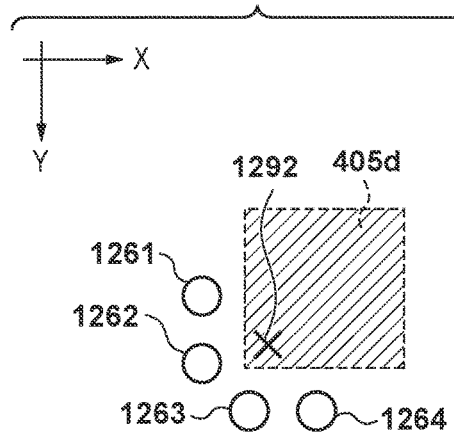
Figure 12H:
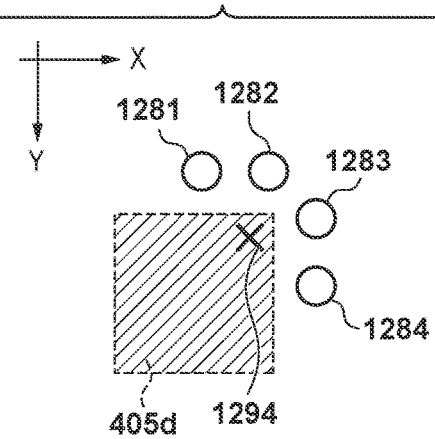

As shown in FIG. 12H, four designation areas 1281, 1282, 1283, and 1284 outside the area 405*d* and spaced apart by the distance d from the position of a point 1294 near (within the area 405d) the upper right apex of the area 405d are obtained, and an area including these four designation areas is obtained as the upper right candidate area.

As shown in FIG. 12F, four designation areas 1261, 1262, 1263, and 1264 outside the area 405d and spaced apart by the distance d from the position of a point 1292 near (within the area 405d) the lower left apex of the area 405d are obtained, and an area including these four designation areas is obtained as the lower left candidate area.

As shown in FIG. 12G, four designation areas 1271, 1272, 1273, and 1274 outside the area 405d and spaced apart by the distance d from the position of a point 1293 near (within the area 405d) the lower right apex of the area 405d are obtained, and an area including these four designation areas is obtained as the lower right candidate area.

Designation areas are areas where respective interfaces for processing designation are to be displayed. The center point of each designation area and a predetermined point (1201 to 1204, 1291 to 1294) are spaced apart by the distance d.

Figure 8A:
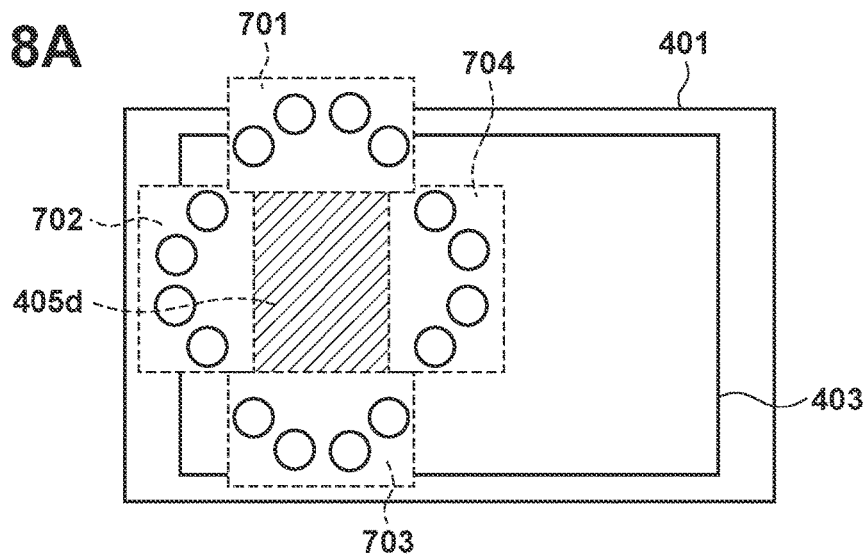
FIGS. 8A to 8C are views showing candidate areas 701 to 708.
Figure 8B:
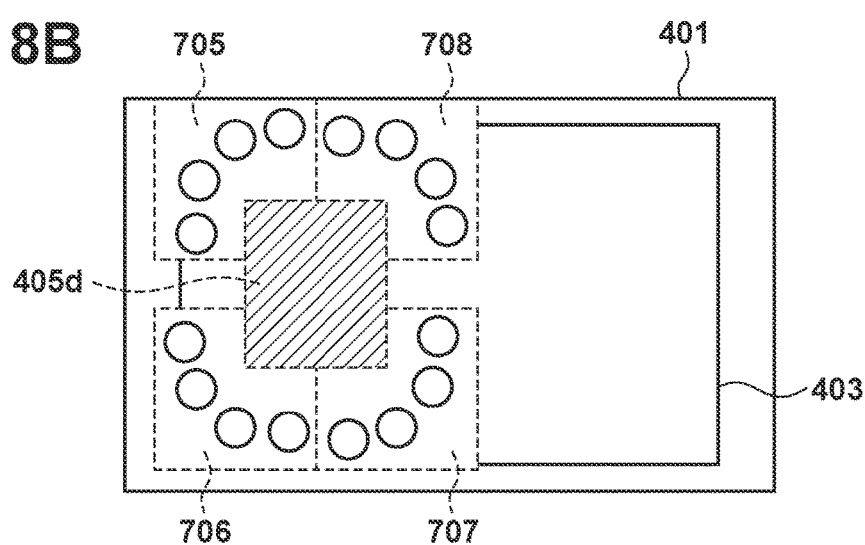

As candidate areas, the upper candidate area, the left candidate area, the lower candidate area, the right candidate area, the upper left candidate area, lower left candidate area, the lower right candidate area, and the upper right candidate area are indicated by reference numerals 701 to 708, respectively in FIGS. 8A and 8B. The candidate areas 705 to 708 are laid out so as to partially overlap the area 405d. If the candidate areas 705 to 708 are laid out, in the same manner as the candidate areas 701 to 704, so as not to overlap the area 405d, portions protruding from the display area 403 will increase, and it may become difficult for the candidate areas 705 to 708 to be selected as the final candidate areas in the subsequent processing to be described below.

In the above description, the upper candidate area, the left candidate area, the lower candidate area, the right candidate area, the upper left candidate area, lower left candidate area, the lower right candidate area, and the upper right candidate area have been obtained in the manner as shown in FIGS. 12A to 12H. However, the method of obtaining the upper candidate area, the left candidate area, the lower candidate area, the right candidate area, the upper left candidate area, lower left candidate area, the lower right candidate area, and the upper right candidate area is not limited to this, and the number of candidate areas is not limited to eight.

In addition, for example, the layout of the four designation areas can be determined by another method rather than by determining the layout of the four designation areas by the distance from a given position. For example, for the upper, lower, left, or right side of the area 405d, two designation areas can be provided on one side and two designation areas can be provided on the other side so that the areas will be symmetric with respect to a line segment passing the center point and is perpendicular to the corresponding side of the area 405d passing the center point. For the four corners of the area 405d, two designation areas can be provided on one side and two designation areas can be provided on the other side so that the areas will be symmetric with respect to a line segment passing a position of the points (1291 to 1294) near the apex and a position of an opposing apex.

<Step S202>

The CPU 204 excludes, out of the candidate areas 701 to 708 obtained in step S201, areas that partially or wholly protrude from the display area of the window 401 and sets the remaining candidate areas (non-excluded candidate areas) as the targets for subsequent processes.

<Step S203>

The CPU 204 determines whether the number of candidate areas not excluded in step S202 is 0. As a result of this determination, if the number of candidate areas not excluded in step S202 is 0, the process advances to step S212. On the other hand, if the number of candidate areas not excluded in step S202 is 1 or more, the process advances to step S204.

<Step S204>

The CPU 204 obtains, for each non-excluded candidate area, an area S (number of pixels) of the area protruding (protruding area) from the display area 403.

<Step S205>

The CPU 204 determines, for each non-excluded candidate area, whether the area S obtained for each non-excluded area in step S204 is equal to or more than $\alpha(0<\alpha<100)$ % of the entire area of the non-excluded candidate area. As a result, the CPU 204 excludes, out of non-excluded candidate areas, each area whose area S, obtained in step S204 for each non-excluded candidate, is equal to or more than $\alpha$ % of the entire non-excluded candidate area and sets the remaining non-excluded areas (target areas) as the targets of subsequent processes. Here, the value of a may be a predetermined value or be changed as needed by the user by operating the operation unit 203. That is, if the area of the protruding area exceeds a predetermined ratio of the candidate area, that candidate is excluded from a target area.

<Step S206>

The CPU 204 determines whether the number of target areas equals 0. As a result of this determination, if the number of target areas is 0, the process advances to step S212. If the number of target areas is 1 or more, the process advances to step S207.

<Step S207>

The CPU 204 selects, out of the target areas, an area with the smallest area of the protruding area as the target area for subsequent processes.

<Step S208>

The CPU 204 determines whether a plurality of target areas have been selected in step S207. As a result of this determination, if there are a plurality of target areas (YES in step S208), the process advances to step S209. If there is only one target area (NO in step S208), the process advances to step S210.

<Step S209>

Figure 10A:
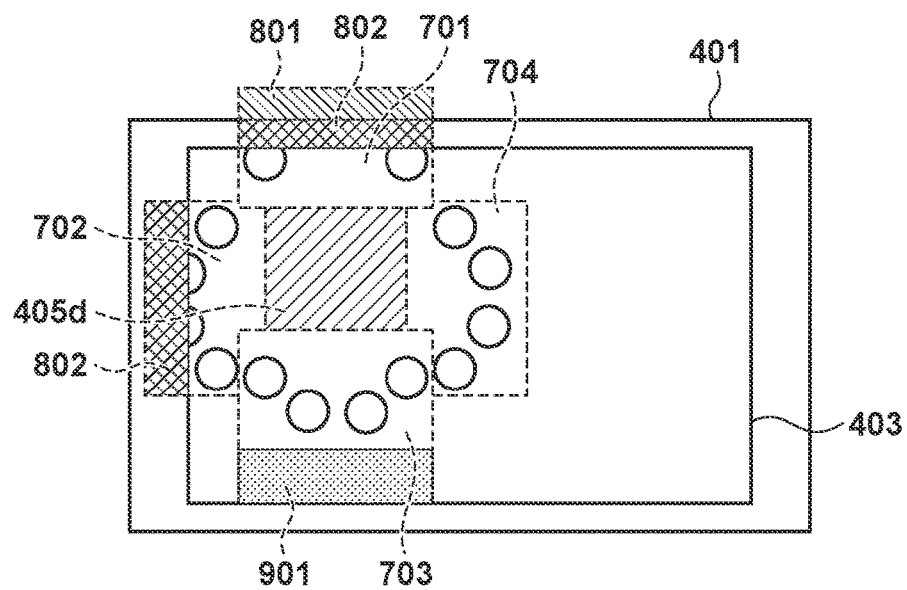
FIGS. 10A and 10B are views each showing a situation in which the candidate area 707 is selected as the final candidate area.
Figure 10B:
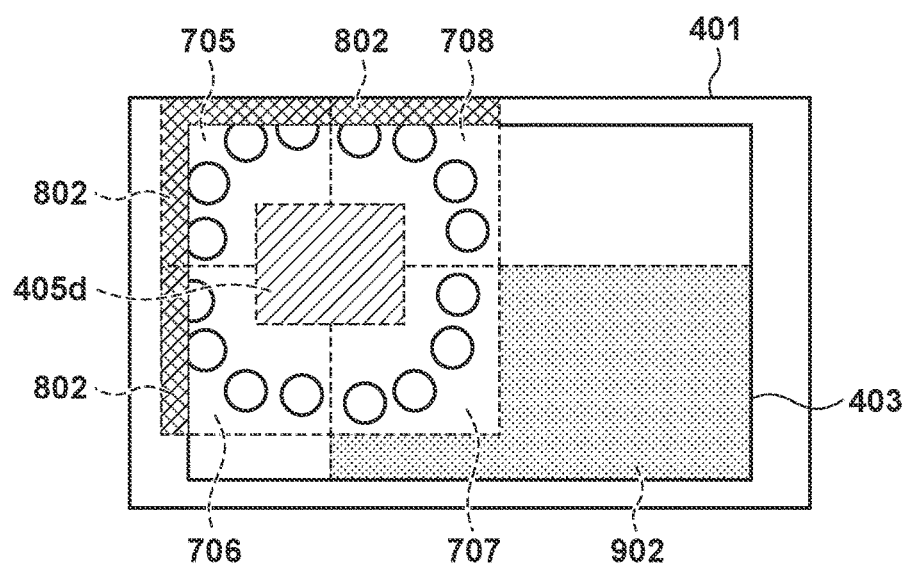

The CPU 204 sets a display space area for each target area and selects the target area set with the largest display area as the final candidate area. A display space area is, for example, in the case of an upper candidate area, an area surrounded by a line segment that is obtained by extending the left side of the upper candidate area in the upward direction, a line segment that is obtained by extending the right side of the upper candidate area in the upward direction, the upper side of the upper candidate area, and the upper side of the display area 403. The display space area in the case of a lower candidate area is, as shown in FIG. 10A, an area (display space area 901) surrounded by a line segment that is obtained by extending the left side of the lower candidate area in the downward direction, a line segment candidate that is obtained by extending the right side of the lower candidate area in the downward direction, the lower side of the lower candidate area, and the lower side of the display area 403. The display space area in the case of a left candidate area is an area surrounded by a line segment that is obtained by extending the upper side of the left candidate area in the leftward direction, a line segment that is obtained by extending the lower side of the left candidate area in the leftward direction, the left side of the left candidate area, and the left side of the display area 403. The display space area in the case of a right candidate area is an area surrounded by a line segment that is obtained by extending the upper side of the right candidate area in the rightward direction, a line segment that is obtained by extending the lower side of the right candidate are in the rightward direction, the right side of the right candidate area, and the right side of the display area 403. The display space area in the case of an upper left candidate area is an area (excluding the upper left candidate area) surrounded by a line segment that is obtained by extending the right side of the upper left candidate area in the upward direction, a line segment that is obtained by extending the lower side of the upper left candidate area in the leftward direction, and the upper and left sides of the display area 403. The display space area in the case of an upper right candidate area is an area (excluding the upper right candidate area) surrounded by a line segment that is obtained by extending the left side of the upper right candidate area in the upward direction, a line segment that is obtained by extending the lower side of the upper right candidate area in the rightward direction, and the upper and right sides of the display area 403. The display space area in the case of a lower left candidate area is an area (excluding the lower left candidate area) surrounded by a line segment that is obtained by extending the right side of the lower left candidate area in the downward direction, a line segment that is obtained by extending the upper side of the lower left candidate area in the leftward direction, and the lower and left sides of the display area 403. The display space area in the case of the lower right candidate area is, as shown in FIG. 10B, an area (excluding the lower right candidate area) surrounded by a line segment that is obtained by extending the left side of the lower right candidate area in the downward direction, a line segment that is obtained by extending the upper side of the lower right candidate area in the rightward direction, and the lower and right sides of the display area 403.

Note that if there are a plurality of target areas which have the largest area of the display space area, an appropriate criterion can be used to select a single target area as the final candidate area. Various kinds of criteria can be used as the criterion, and the present invention is not limited to a specific criterion.

Additionally, various kinds of methods can be used as the method to select one target area out of the plurality of target areas. For example, a level of priority can be set for each of the upper candidate area, left candidate area, lower candidate area, right candidate area, upper left candidate area, lower left candidate area, lower right candidate area, and upper right candidate area, and the candidate area which has the highest level of priority can be selected as the final candidate area. Note that in the case of a method in which the final candidate area is selected based on the size of the display space area, the size of the display space is directly used as the level of priority. Therefore, the method of defining the display space area can be defined by another method of defining the display space so that the level of priority toward each of the upper candidate area, left candidate area, lower candidate area, right candidate area, upper left candidate area, lower left candidate area, lower right candidate area, and upper right candidate area can become a desired level of priority.

<Step S210>
The CPU 204 selects the single target area as the final candidate area (selection candidate area).

<Step S211>
The CPU 204 lays out the icons 501 to 504 on the four designation areas obtained in step S201 for the area selected as the final candidate area. Which of the icons 501 to 504 is to be laid out on which of the four designation areas can be determined as follows. For example, the icons 501 to 504 are laid out in order from the left in the following manner: the icon 501 is laid out on the designation area 1211, the icon 502 is laid out on the designation area 1212, the icon 503 is laid out on the designation area 1213, and the icon 504 is laid out on the designation area 1214. In the case of FIG. 12C, the icons 501 to 504 are laid out in order from the left in the same manner: the icon 501 is laid out on the designation area 1231, the icon 502 is laid out on the designation area 1232, the icon 503 is laid out on the designation area 1233, and the icon 504 is laid out on the designation area 1234. In the cases of FIGS. 12B and 12D, the icons 501 to 504 are laid out in order from the top.

Figure 8C:
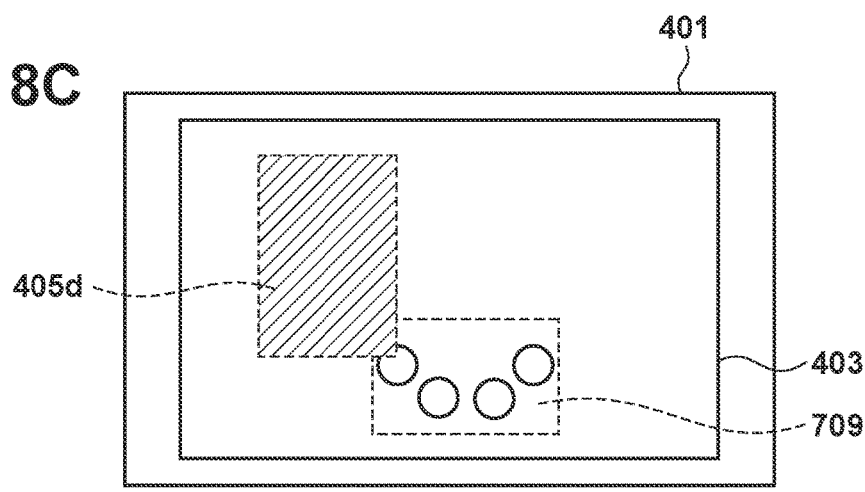

<Step S212>
CPU 204 selects, as shown as in FIG. 8C, a candidate area 709, which includes the four designation areas having a predetermined layout, as the final candidate area.

Next, in a situation (FIGS. 9A and 9B) in which the candidate area 704 is to be selected as the final candidate area out of the candidate areas 701 to 708, the processing sequence until the candidate area 704 is selected as the final candidate area will be described in accordance with the flowchart of FIG. 7.

Figure 9A:
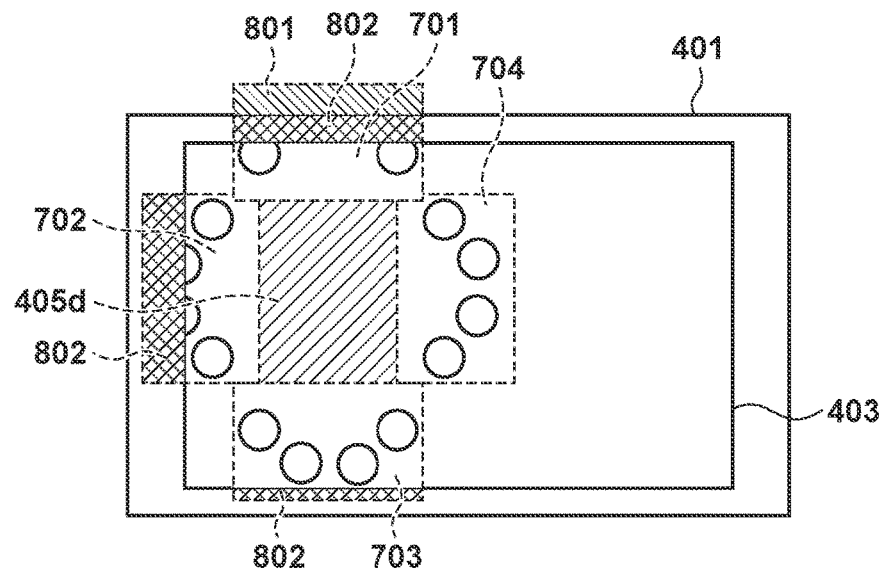
FIGS. 9A and 9B are views each showing a situation in which the candidate area 704 is selected as a final candidate area.
Figure 9B:
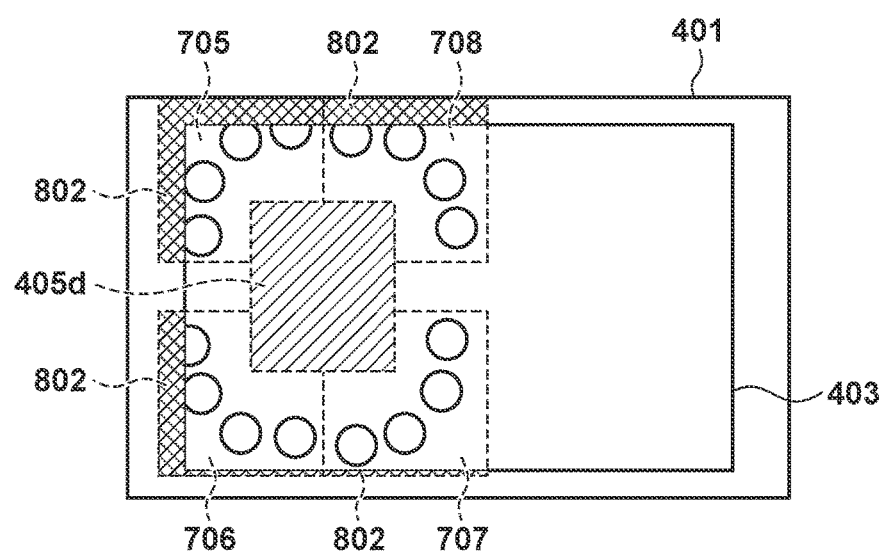

The candidate areas 701 to 708 of FIGS. 9A and 9B are obtained in step S201. In step S202, the candidate area 701 (area that includes a protruding area 801) protruding from the display area of the window 401 is excluded from the candidate areas 701 to 708, and the candidate areas 702 to 708 become the subsequent targets. Next, in step S204, an area 802 protruding from the display area 403 is obtained for each of the candidate areas 702 to 708. In step S205, letting α=50%, the candidate area 702, more than half of which is the area 802, is excluded out of the candidate areas 702 to 708. Then, in step S207, the candidate area 704 having the smallest area of the area 802 out of the candidate areas 703 to 708 is selected as the target area. In step S210, since only a single area is present, the candidate area 704 is selected as the final candidate area. Subsequently, in step S211, the icons 501 to 504 are laid out on the four designation areas (1241, 1242, 1243, and 1244) within the candidate area 704.

Next, in a situation (FIGS. 10A and 10B) in which the candidate area 707 is to be selected as the final candidate area out of the candidate areas 701 to 708, the processing sequence until the candidate area 707 is selected as the final candidate area will be described in accordance with the flowchart of FIG. 7.

The candidate areas 701 to 708 of FIGS. 10A and 10B are obtained in step S201. In step S202, the candidate area 701 (area that includes a protruding area 801) protruding from the display area of the window 401 is excluded from the candidate areas 701 to 708, and the candidate areas 702 to 708 become the subsequent targets. Next, in step S204, an area 802 protruding from the display area 403 is obtained for each of the candidate areas 702 to 708. In step S205, letting α=50%, the candidate area 702, more than half of which is the area 802, is excluded out of the candidate areas 702 to 708. Then, in step S207, out of the candidate areas 703 to 708, the candidate areas 703 and 707 are selected as target areas as the candidate areas 703 and 707 do not protrude from the display area 403. In step S209, since there are a plurality of target areas, the display space areas 901 and 902 as those described above are set on the respective candidate areas 703 and 707. Since the display space area 902 has a larger area than the display space area 901, the candidate area 707 is selected as the final candidate area. Subsequently, in step S211, the icons 501 to 504 are laid out on the four designation areas (1271, 1272, 1273, and 1274) within the candidate area 707.

Next, in a situation (FIG. 11) in which none of the candidate areas 701 to 708 are selected as the final selection candidate and the candidate area 709 is selected as the final candidate area, the processing sequence until the candidate area 709 is selected as the final candidate area will be described in accordance with the flowchart of FIG. 7.

Figure 11:
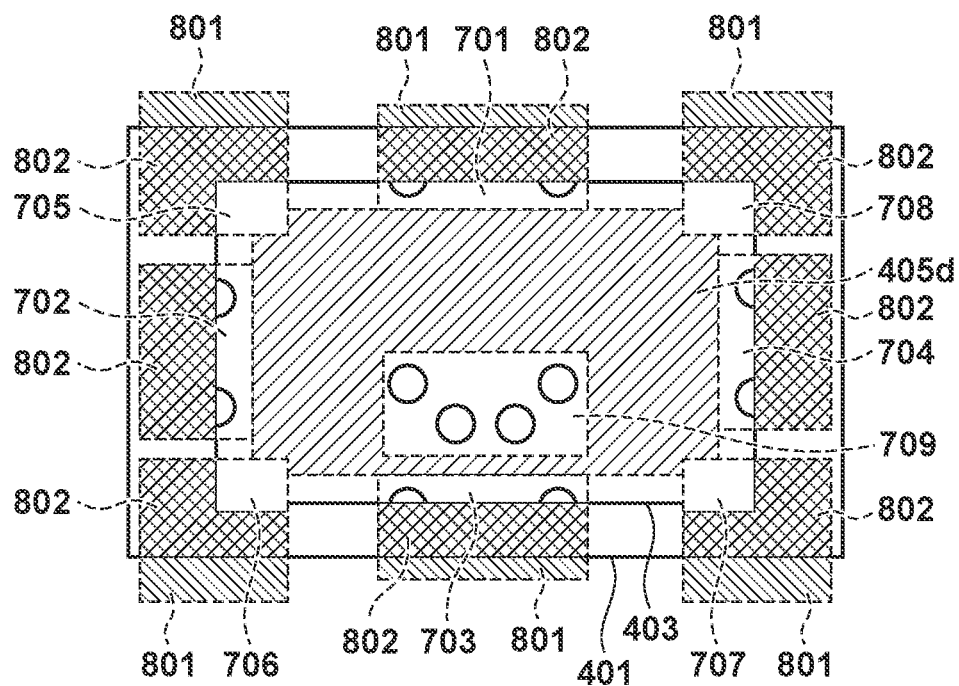
FIG. 11 is a view showing a situation in which a candidate area 709 is selected as the final candidate area.

The candidate areas 701 to 708 of FIG. 11 are obtained in step S201. In step S202, out of the candidate areas 701 to 708, the candidate areas 701, 703, 705, 706, 707, and 708 (areas where the respective areas 801 protrude) protruding from the display area of the window 401 are excluded, and the candidate areas 702 and 704 become the subsequent target areas. Next, in step S204, the area 802 protruding from the display area 403 is obtained for each of the candidate areas 702 and 704. Here, in step S205, letting α=50%, the candidate areas 702 and 704 each having half or more portions of the area 802 are excluded out of the candidate areas 702 and 704. At this time, in step S212, since the number of target areas is 0, the candidate area 709 is selected as the final candidate area. Subsequently, in step S211, the icons 501 to 504 are laid out on the four designation areas in the candidate area 709.

In this manner, when the area occupied by the area 405d is comparatively large with respect to the display area 403, any of the candidate areas 701 to 708 can protrude largely from the display area 403 if they are laid out in a manner not to overlap the area 405d. In such a case, a candidate area such as the candidate area 709 which minimally overlaps the area 405d is selected. As a matter of course, in such a case, rather than using an area such as the candidate area 709, an area for laying out the icons 501 to 504 at arbitrary positions may be set.

According to the first embodiment, an interface (processing selection dialogue) for processing designation can be displayed so that it will not overlap the target processing object (selected image). Hence, the user can select the interface for processing designation while viewing the processing target object image.

<Modification 1>

The positions of the four designation areas for obtaining each of the upper left candidate area, lower left candidate area, upper right candidate area, and the lower right candidate area with respect to the area 405d and the size of the icons which are to be laid out on the four designation areas may be changed in accordance with the size of the area 405d.

Figure 13A:
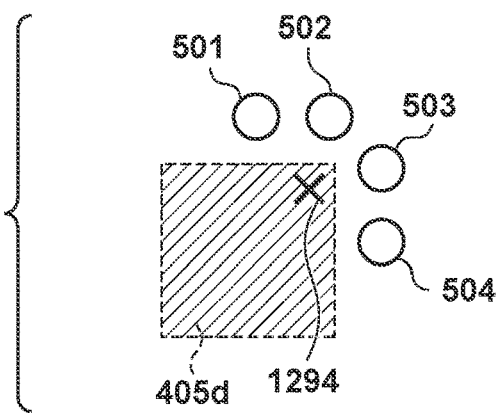
FIGS. 13A to 13C are views for explaining modification 1.
Figure 13B:
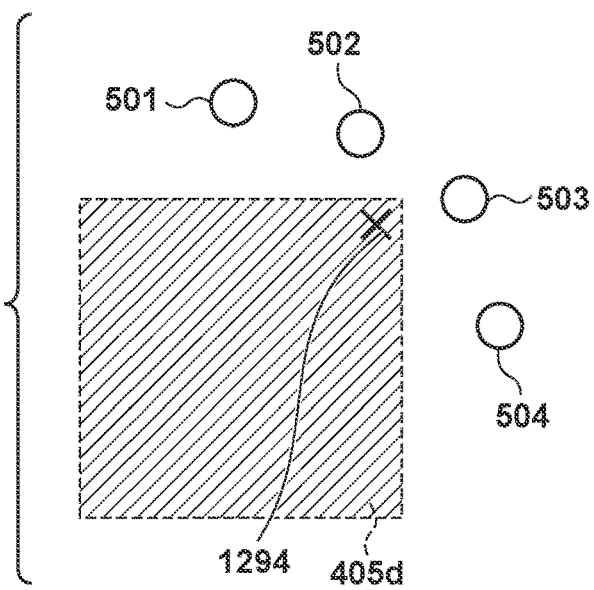
Figure 13C:
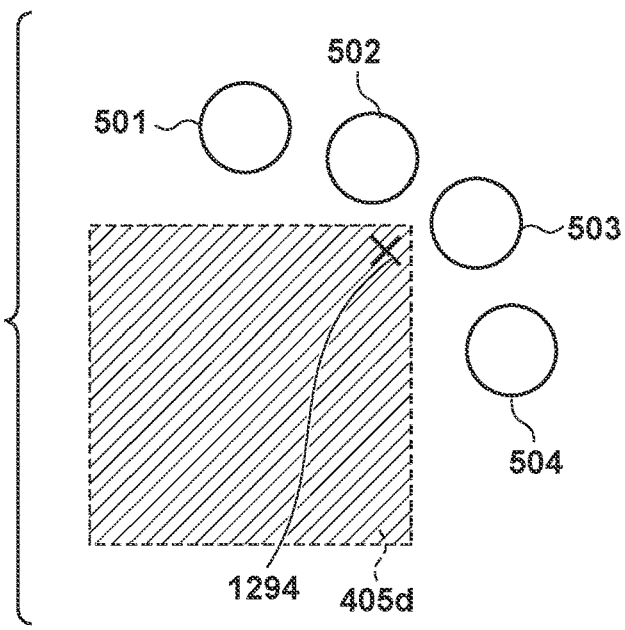

FIG. 13A shows the four designation areas for obtaining the upper right candidate area by the processing described in the first embodiment and the icons 501 to 504 which are to be laid out on the four designation areas. The area 405d shown in both FIGS. 13B and 13C is larger than the area 405d shown in FIG. 13A. In this case, as shown in FIG. 13B, the interval between the four designation areas can be made larger than the interval between the four designation areas in FIG. 13A, and the curvature of the curve drawn by the four designation areas can be made smaller than that of the FIG. 13A. That is, the layout of the four designation areas can be changed as needed from the layout of the four designation areas in FIG. 13A. In addition, as shown in FIG. 13C, the size of the four designation areas, that is, the size of the icons 501 to 504 to be laid out on the respective designation areas can be made larger than the size of the icons 501 to 504 shown in FIG. 13A.

<Modification 2>

Any kind of an apparatus may be used as long as it is an apparatus that can implement the same processing in place of the PC 1 or 2. For example, in place of the PC 1, a tablet terminal apparatus or a device such as a smartphone may be used.

<Modification 3>

Although four icons (processes) are set for a single image in the first embodiment, the number of icons is not limited to this. In addition, the number of icons need not be the same for the areas 405a to 405d and may be changed depending on area.

Although the shape of the icon is circular in the first embodiment, the icon is not limited to a circular shape and can have an arbitrary shape. In addition, the icon representation method can simply use two-dimensional graphics, a character string, or a three-dimensional virtual object. Additionally, although the shape of the candidate area is a rectangle including the four designation areas in the first embodiment, the shape of the candidate area is not limited to this and may be any shape as long as the four designation areas are included. However, it is desired to set the shape so that the number of areas other than the four designation areas will becomes small. Furthermore, in the first embodiment, one candidate area out of a plurality of candidate areas is selected. However, rather than selecting a candidate area which includes the four designation areas, the layout pattern of four designation areas may be selected. In this case, it is determined, in step S202, whether any of the four designation areas does not protrude from the window, and the total amount of protrusion of the four designation areas can be used as the area of the protruding area in steps S204 and S207.

Second Embodiment

Figure 6:
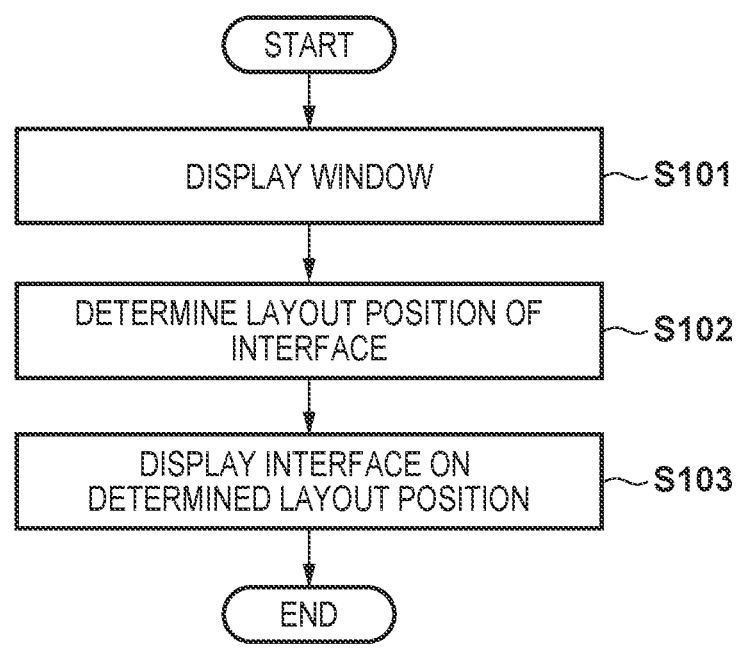
FIG. 6 is a flowchart of processing performed by the PC 1.
Figure 7:
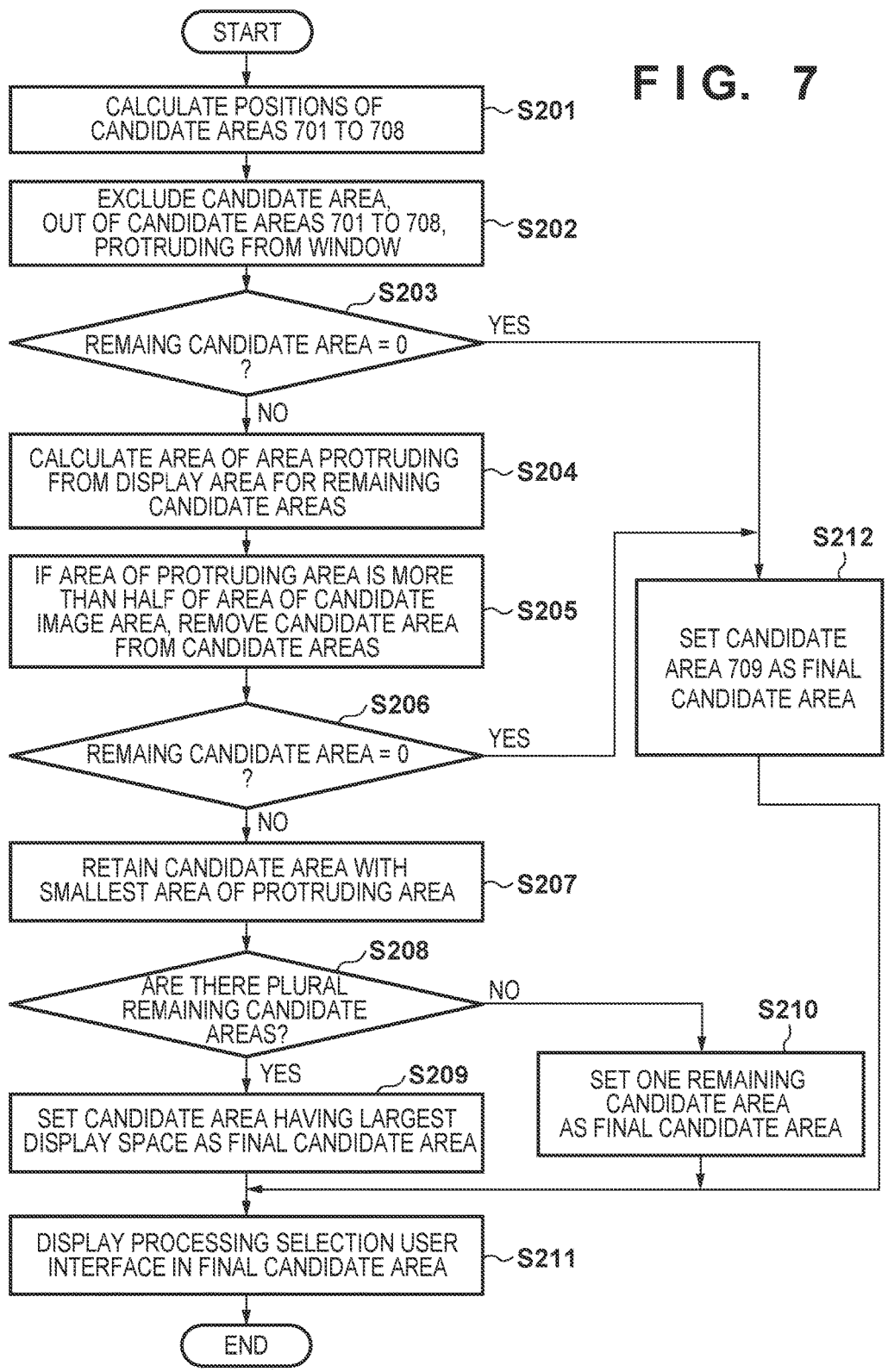
FIG. 7 is a flowchart showing details of processes of steps S102 and S103.

Processes according to the flowcharts of FIGS. 6 and 7 are not limited to the purpose of creating a photo album and uploading the created photo album to a PC 2 and can be used for various situations and various purposes. For example, in a situation where an image shot using a digital camera or a graphic image such as CG can be displayed on the PC 1 and a user performs image editing on the displayed image by operating the PC 1, it is possible to consider a case in which processes for image editing are to be displayed as icons. Even in such a case, it is possible to apply the processes according to the flowcharts of FIGS. 6 and 7. Furthermore, areas 405a to 405d are not limited to only laying out images, but may also lay out a text.

Each area (areas 405a to 405d) for laying out an image or characters can be set as the object, or an object such as a person displayed on an image can be simply set as an object. Anything can be set as the object as long as it can be displayed on the screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157508, filed Aug. 7, 2015, which is hereby incorporated by reference herein in its entirety.

What is claimed is:

1. An image processing apparatus comprising:
at least one processor and at least one memory storing instructions that, when executed by the at least one processor, cause the image processing apparatus to:
display, in a first region on a display screen, a plurality of thumbnails of pages;
display, in a second region on the display screen, a page corresponding to a thumbnail which is selected from among the plurality of thumbnails of pages displayed in the first region;
acquire a first candidate area and a second candidate area each of which is a candidate to lay out a display item that allows a user to instruct processing for a target image in the page displayed in the second region, wherein each of the first candidate area and the second candidate area is an area such that the display item does not overlap the target image;
specify, after acquiring the first candidate area and the second candidate area, a first outside area and a second outside area, each of which extends beyond the second region, wherein the first outside area is a part of the first candidate area and the second outside area is a part of the second candidate area;
determine which outside area is smaller among the first outside area extending beyond the second region and the second outside area extending beyond the second region;
select, out of the first candidate area and the second candidate area, one candidate area including an outside area that is determined to be smaller among the first outside area extending beyond the second region and the second outside area extending beyond the second region; and
display the display item in the selected one candidate area on the display screen.

2. The apparatus according to claim 1, wherein the first candidate area and the second candidate area are acquired from locations around the target image.

3. The apparatus according to claim 1, wherein the selected one candidate area does not extend beyond the display screen.

4. The apparatus according to claim 3, wherein, a predetermined candidate area is selected in a case in which there are no candidate areas not extending beyond the display screen.

5. The apparatus according to claim 1, wherein, in accordance with a size of the target image, a layout or a size of the display item is changed.

6. The apparatus according to claim 1,
wherein the target image is an image of one object designated according to a user operation out of a plurality of objects displayed on the display screen, and
wherein the display item is displayed in response to the designation of the target image.

7. The apparatus according to claim 1, wherein the target image is a layout area for laying out one of an image and a character according to user operation.

8. The apparatus according to claim 7, wherein the display item is an icon representing processing for one of an image and a character laid out on the layout area.

9. An image processing method for controlling an image processing apparatus having at least one processor and at least one memory storing instructions, the method comprising:
displaying, in a first region on a display screen, a plurality of thumbnails of pages;
displaying, in a second region on the display screen, a page corresponding to a thumbnail which is selected from among the plurality of thumbnails of pages displayed in the first region;
acquiring a first candidate area and a second candidate area each of which is a candidate to lay out a display item that allows a user to instruct processing for a target image in the page displayed in the second region, wherein each of the first candidate area and the second candidate area is an area such that the display item does not overlap the target image;
specifying, after acquiring the first candidate area and the second candidate area, a first outside area and a second outside area, each of which extends beyond the second region, wherein the first outside area is a part of the first candidate area and the second outside area is a part of the second candidate area;
determining which outside area is smaller among the first outside area extending beyond the second region and the second outside area extending beyond the second region;
selecting, out of the first candidate area and the second candidate area, one candidate area including an outside area that is determined to be smaller among the first outside area extending beyond the second region and the second outside area extending beyond the second region; and
displaying the display item in the selected one candidate area on the display screen.

10. The method according to claim 9, wherein the first candidate area and the second candidate area are acquired from a plurality of locations around the target image.

11. The method according to claim 9, wherein the selected one candidate area does not extend beyond the display screen.

12. The method according to claim 11, wherein, a predetermined candidate area is selected in a case in which there are no candidate areas not extending beyond the display screen.

13. The method according to claim 9, wherein, in accordance with a size of the target image, a layout or a size of the display item is changed.

14. The method according to claim 9,
wherein the target image is an image of one object designated according to a user operation out of a plurality of objects displayed on the display screen, and
wherein the display item is displayed in response to the designation of the target image.

15. The method according to claim 9, wherein the target image is a layout area for laying out one of an image and a character according to user operation.

16. The method according to claim 15, wherein the display item is an icon representing processing for one of an image and a character laid out on the layout area.

17. A non-transitory computer readable storage medium storing a computer program for causing a computer having at least one processor and at least one memory to perform an image processing method comprising:

displaying, in a first region on a display screen, a plurality of thumbnails of pages;

displaying, in a second region on the display screen, a page corresponding to a thumbnail which is selected from among the plurality of thumbnails of pages displayed in the first region;

acquiring a first candidate area and a second candidate area each of which is a candidate to lay out a display item that allows a user to instruct processing for a target image in the page displayed in the second region, wherein each of the first candidate area and the second candidate area is an area such that the display item does not overlap the target image;

specifying, after acquiring the first candidate area and the second candidate area, a first outside area and a second outside area, each of which extends beyond the second region, wherein the first outside area is a part of the first candidate area and the second outside area is a part of the second candidate area;

determining which outside area is smaller among the first outside area extending beyond the second region and the second outside area extending beyond the second region;

selecting, out of the first candidate area and the second candidate area, one candidate area including an outside area that is determined to be smaller among the first outside area extending beyond the second region and the second outside area extending beyond the second region; and displaying the display item in the selected one candidate area on the display screen.

\* \* \* \* \*